July 11, 1939.  O. F. QUARTULLO  2,166,099
MULTIPLE-AXLE DRIVE
Filed Dec. 23, 1937   3 Sheets-Sheet 1

INVENTOR:
ORPHEUS F. QUARTULLO
BY
ATTORNEY.

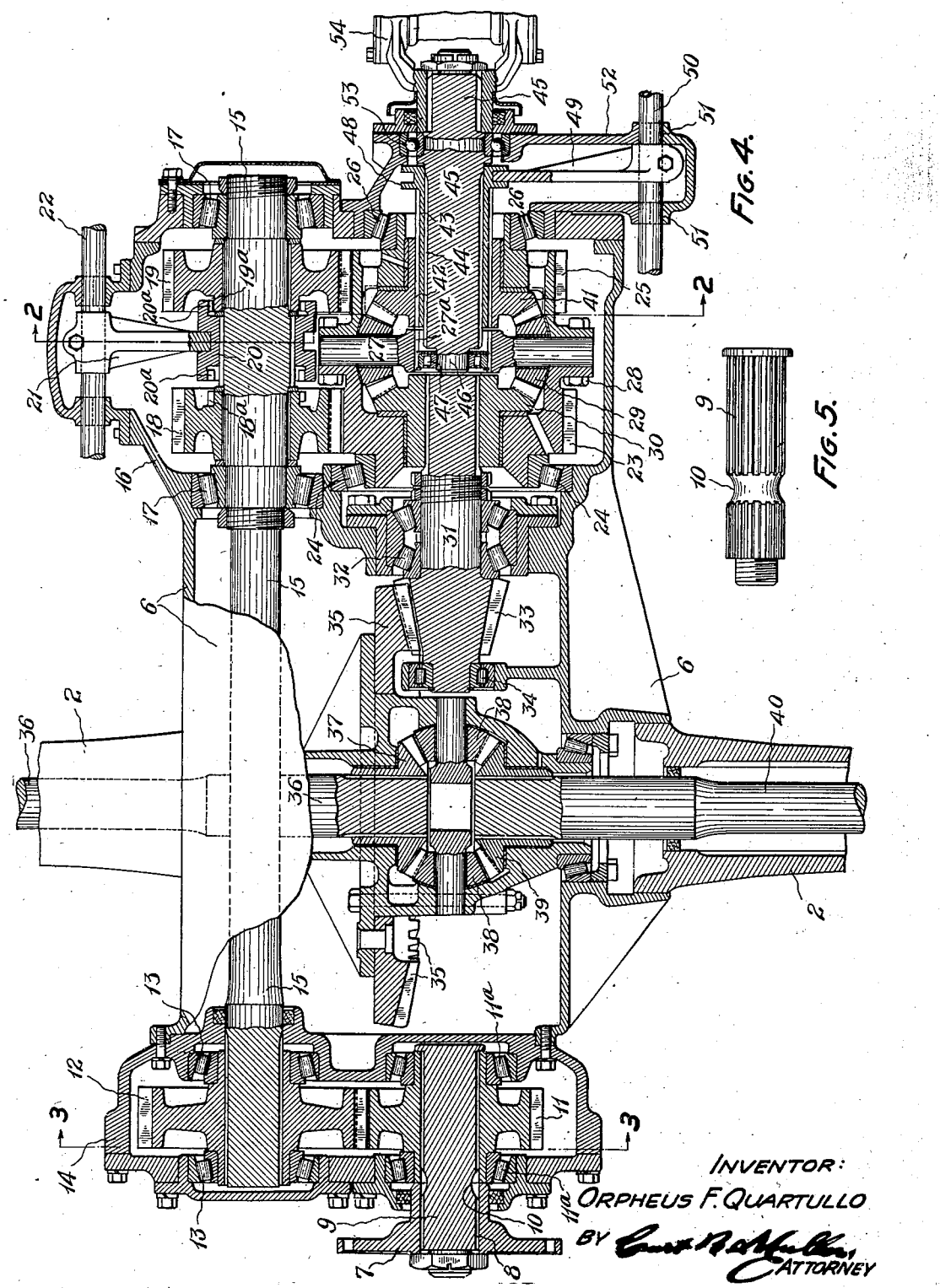

July 11, 1939.                    O. F. QUARTULLO                    2,166,099
                                 MULTIPLE-AXLE DRIVE
                              Filed Dec. 23, 1937          3 Sheets-Sheet 3
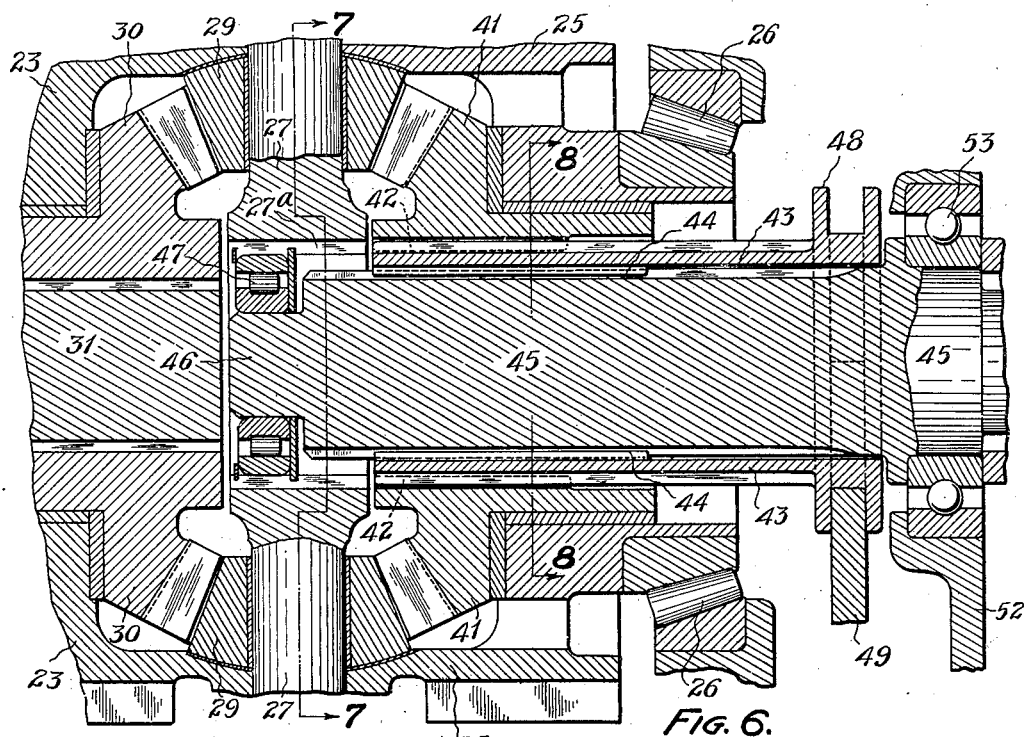
FIG. 6.
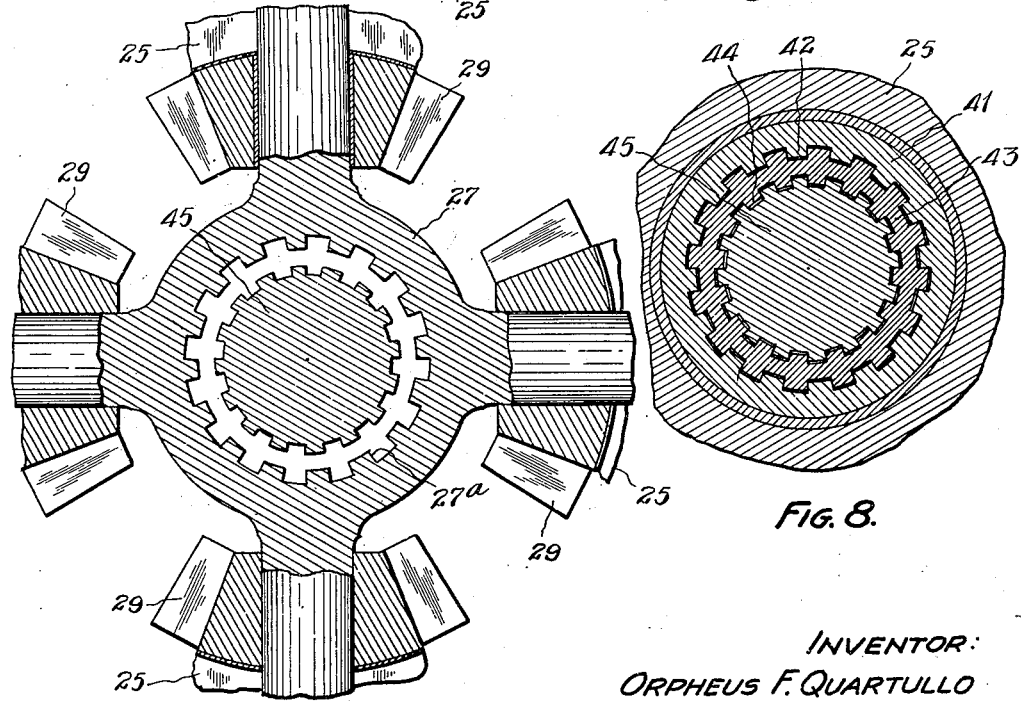
FIG. 7.
FIG. 8.
INVENTOR:
ORPHEUS F. QUARTULLO
BY
ATTORNEY.

Patented July 11, 1939

2,166,099

UNITED STATES PATENT OFFICE 2,166,099

MULTIPLE-AXLE DRIVE

Orpheus F. Quartullo, Shaker Heights, Ohio

Application December 23, 1937, Serial No. 181,383

7 Claims. (Cl. 180—22)

My invention pertains to a selective two-speed transmission together with suitable shifting devices for transferring the drive from one train of mechanism to another. The graphical portrayal and description of the principles of my improvement are merely exemplified in a tandem rear axle unit or four-wheel drive.

Heavy duty trucks which are desirably equipped with more than the two-wheel drive of a single differential axle structure are expectably to be subject to conditions requiring not only added traction, but also selective speed control independently of the set of gear ratios forwardly of the propeller shaft. Moreover, for both operating and commercial reasons, it is preferable to have the four-wheel-drive compact and sturdy, which is what my structural arrangement provides in advantageous association with its primary object.

Each of the two rear axle structures, which extend crosswise of the vehicle, comprises a differential gear-set between its pair of alined axles which respectively carry its wheels, but here the one nearest the universal joint terminus of the primary propeller shaft is not directly driven by the latter as in some earlier four-wheel-drive constructions. Instead, the rotation of the propeller shaft is transmitted by appropriate gearing to a countershaft and thence alternately through one or the other of two gear trains to a differential spider which is interposed between and connected with the proximate ends of two shafts extending forwardly and rearwardly from said spider and each connected with one of the axle structures. While the employment of an axially slidable locking sleeve provided with both internal and external splines is not new, its adaptation hitherto has furnished inadequate strength against shearing strains, consequent to insufficient support on one diametrical side of the sleeve. I have remedied by supporting the operatively engaged end of such a sleeve on diametrically opposed sides and by maintaining its double splined engagement along equal axially measured distances.

In heavy duty automotive road vehicles, it has long been standard practice to employ a four or more speed-change transmission set between the engine and the propeller shaft. In this construction I additionally employ alternative two-speed transmission trains for selectively communicating power simultaneously to two differential axle structures which are in tandem relationship and furthermore provide in the complete connection, between the standard speed-change box and the driven axles, a plurality of readily interchangeable gears for furnishing a further multiple of speeds. For instance, supposing the standard speed-change gear box to permit of four different forward speeds, I provide a multiple thereof at two seperated places, exemplifiedly, two double multiples whereby I may selectively realize sixteen (16) different speeds. One or both of my additional selective speed-change multiples may be subject to clutch control.

It is to be realized that the scope of my invention comprehends many equivalent constructions. The showing of the drawings and the particular description are merely specific exemplifications of a plurality of mechanical embodiments and arrangements. For example, instead of spur and mitre gearing, I would have it understood that worm and worm wheel gearing as disclosed in my Patent No. 2,041,484 of May 19, 1936, or hypoid or other feasible systems of gearing might be employed.

Adverting to the drawings:—

Figure 4 is a greatly enlarged developed plan view on line 4—4 of Figure 2.

Figure 5 is a plan view of one particular shaft.

Figure 6 is a still further enlarged view corresponding to a portion of Figure 4.

Figure 7 is a transverse section taken on line 7—7 of Figure 6.

Figure 8 is a transverse section taken on line 8—8 of Figure 6.

Figures 1, 2, 3:
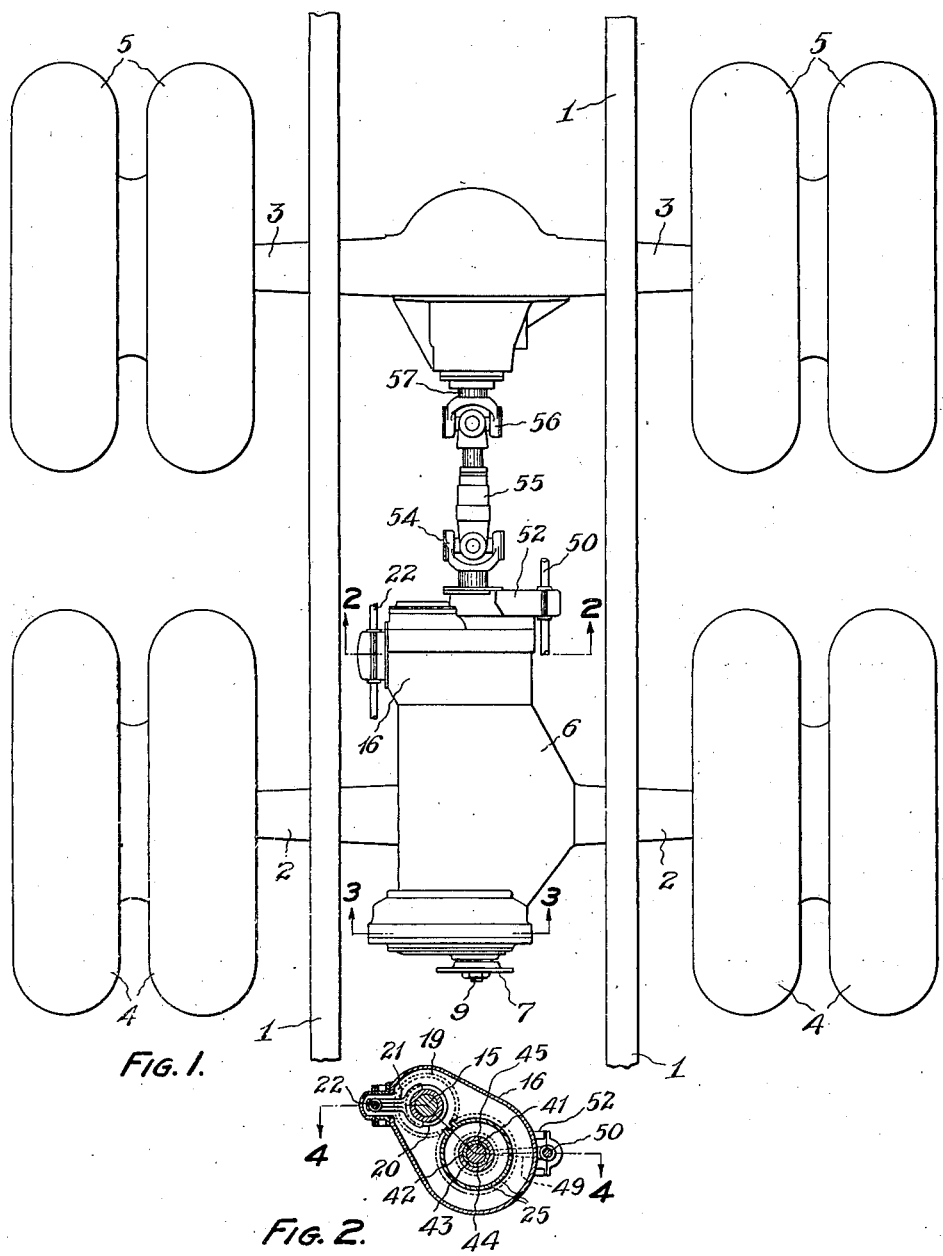
Figure 1 is a plan view of the rear of a truck chassis showing two driven-differential-axle housings in tandem relationship together with the structure embodying my present invention.
Figure 2 is a vertical section viewed on line 2—2 of Figure 1.
Figure 3 is a vertical section viewed on line 3—3 of Figure 1.

Considering first the disclosure of Figure 1, a frame 1 extends across a pair of rear axle housings 2 and 3. Connected through the housing 2 and at each end thereof are dual wheels 4 and similarly shown at the axle housing 3 are two sets of dual wheels 5. The forward axle housing 2 carries a composite housing 6, the front end of which supports a driving connector 7 for attachment in the conventional manner with a universal joint (not shown) which is to be supposed in turn to be connected with the standard speed-change transmission. The connector 7 is splined at 8 to a short propeller shaft 9 which is shown in Figure 5 to be provided with an annular recess 10, the purpose of which is deliberately to make it the safety link in the complete train of transmission to provide against shearing fracture of any other unit because the shaft 9 may be more readily and cheaply replaced.

Also in splined connection with the shaft 9 is a gear 11 mounted in roller races 11a and in mesh with a larger gear 12 which is disposed diagonally upward, as shown at an angle of forty-five degrees (45°), and which is in turn mounted in roller races 13. The gears 11 and 12 turn in a raised conveniently accessible front enlargement 14 of the housing 6 and are readily interchangeable to provide two different speed ratios as between the propeller shaft 9 and a driving countershaft 15, the forward end of which is driven by the gear 12. This shaft extends in its elevated position rearwardly through the housing 6 and parallel with the shaft 9. The rear end of the countershaft 15 enters another enlargement 16 of the housing 6 where it is supported by two spaced roller races 17 and between which it carries two differently sized gears 18 and 19 which are also in spaced relation and which are provided on opposed sides with external clutch elements 18a and 19a as appears in Figure 4. A clutch 20 is in slidable splined connection with the countershaft 15 between the gears 18 and 19. It is fashioned on its opposite sides with complemental internal clutch elements 20a and is purposed to effect a driving connection alternatively between either the gear 18 or the gear 19 with the countershaft 15 as will be readily understood by those duly experienced. The clutch 20 may be shifted in the conventional manner by a fork 21 which has straddling articulation with an annular channel in the clutch member and which is actuated by a rod 22 that is appropriately mounted for sliding movement through the top of the enlargement 16. It will be evident that the rod 22 may be actuated either mechanically or by fluid pressure subject to control at the driver's seat.

The gear 18 being smaller than the gear 19 may be considered as the first speed transfer to the two driven axles but as shown in Figure 4, it idly meshes with a gear 23, the forward side of which is mounted in a roller race 24. The gear 19 is in driving mesh with a gear 25, the rearward side of which is mounted in a roller race 26 and is correspondingly smaller than the gear 23. The gears 23 and 25 are designed to form in conjunction with each other a housing for a differential gear set. To partially complement the latter, I provide a four-armed spider 27 of which the outer arm ends are clamped between flanges of the gears 23 and 25 by means of circumferentially arranged bolts 28 whereby the spider is mounted to rotate with and to be driven by either of its enclosing gears. The center of the spider is hollow and is fashioned with internal splines 27a as may be seen in Figures 4, 6 and 7. Each of the spider arms carries an idler pinion 29 and the four revoluble pinions are in mesh on their forward sides with a mitre gear 30 which is in splined connection with a forwardly extending shaft 31 which is proximately mounted in a double roller race 32 and beyond the latter is fashioned as a bevel pinion 33. Forwardly beyond the pinion 33 the shaft 31 terminates at its mounting within a roller race 34.

In mesh with the pinion 33 is a ring gear 35 which directly drives one of the alined axles 36 within the forward axle housing 2. Splined to the inner end of the axle 36 is a bevel gear 37 which meshes in the conventional manner with a set of idler pinions 38 and which latter are also in mesh with a complemental bevel gear 39 which is similarly splined to the other axle 40 within the housing 2. The rotation of the spider 27, as effected through the gear 23 when the clutch 20 has been shifted to the left instead of as shown in Figure 4, is communicated to a bevel gear 41, which is in mesh with the pinions 29, and thence through its splined connection at 42 to a sleeve 43. The internal spline of the bevel gear 41 is alinedly complemental or conjugate with the internal spline 27a of the spider. Internally the sleeve 43 is in splined connection at 44 along a predetermined extent of a rearwardly extending shaft 45. The forward end of the shaft 45 intersects the spider where it terminates as a reduced extremity 46 steadied in a pilot bearing 47. The sleeve 43 may be slid forwardly into splined engagement with the spider 27 whereby to lock the differential gear set of which it is a part to cause the spider and shaft 45 to rotate in unison as occasional road and traction conditions may require. One of the merits of my construction is consequent to the forward extension of the shaft 45 and the support of its front terminus so that it furnishes firm support throughout the range of movement of the sleeve 43 and especially while it is in its locking position with the spider 27. The rearward end of the sleeve 43 is fashioned as an annular channeled flange 48 with which a shifter fork 49 effectively cooperates when its other end is actuated by a rod 50 movable through appropriate bores 51 in an extension 52 of the housing 16. The movement of the rod 50 is to be similarly controlled from the driver's seat, preferably by fluid pressure actuation. Continuing rearwardly the shaft 45 extends through a ball race 53 beyond which it has conventional connection with a universal joint 54 which has coupling at 55 with a similar universal joint 56 which is in turn connected at 57 in the conventional manner with the differential axle in the rearmost axle housing 3.

The operation may be briefly traced by saying that the connector 7 may be rotated at any one of the four or more selectable rates of speed, to rotate the easily replaceable "safety" shaft 9, the rotation of which is to be communicated to the countershaft 15 through the train of gears 11 and 12. The ratio of rotation as between the shafts 9 and 15 may be varied by interchanging the gears 11 and 12 which may be readily accomplished by opening the forward end of the housing 6 which in Figure 4 may be observed to have its enlargement 14 permit of mounting the gear 11 on the front end of the countershaft and the gear 12 on the shaft 9. If the clutch 20 is in engagement with the first speed gear 18 at the other end of the countershaft, the differential gear set will be actuated through its gear-housing unit 23, the spider 27, idlers 29 and gears 30 and 41. From the differential gear set the drive to the alined differential axles 36 and 40 will be forwardly from the differential gear set of which the spider 27 is a part along the shaft 31 and through its geared connection with the axles 36 and 40. Simultaneously, the drive is communicated rearwardly from the gear 41 through the sleeve 43 to the shaft 45 which leads to the pair of axially alined differential axles in the rear axle housing 3. When it is expedient to eliminate the differential action at the spider 27, the operator of the vehicle may readily effect a locking by causing the sleeve 43 to slide forwardly into splined engagement with the spider 27. The forward extremity of the shaft 45 being constantly steadied by the pilot bearing 47 within the spider, the spider-engaged forward extremity of the sleeve 43 will be likewise reinforced to minimize shearing fracture. If the clutch 20 is shifted rearwardly into driving engagement with the second speed gear 19, as shown in Fig. 4, the comparatively smaller gear 25 will determine the speed of rotation of the spider 27 and therefore the altered speed of rotation forwardly and rearwardly from its gear set to the two axles.

My structural arrangement is such that one or the other of the two alternative different-speed-drives is always connected for transmission of power to the two or more driving axle units. While the drawings illustrate only two types of gearing trains, I would have it understood that besides spur, helical, mitre gearing, worms and worm-wheel gearing or other systems of gearing might be as feasibly employed. The locking sleeve, when shifted to its position where it exercises the function of locking a differential gearing assembly located between the separated differential axles, serves to compel driving of the two or more longitudinally spaced axle units in unison. I also provide between the standard multiple speed gear box transmission and the driving trains to the two or more rear driving axles a set of gearing so constructed as to permit interchanging of two gears of the set thereby permitting further gear ratio modification within widely selectable limits as determined by the relative numbers of teeth on the two mating gears which may be interchanged.

I claim:

1. In a vehicular drive mechanism, the combination of a driving shaft, spaced differential axles and a connection therebetween comprising a pair of axially separated driven shafts and a differential gear set comprising a pair of gears on said shafts respectively and also comprising a centrally hollowed spider interposed between said gears, means movable within said spider for locking said set against differential rotation, one of said driven shafts intersecting said spider and means for steadying said interlocked parts when in functionating position.

2. In a multiple-axle drive, the combination of a propeller shaft, differential axle structures in tandem arrangement crosswise of said shaft, a countershaft, mechanism including shafts and a differential gear set for connecting said axle structures, said gear set including an internally splined spider, selective change-speed trains constantly connected with opposite sides of said spider and each train including a gear loose on said countershaft, a clutch for alternatively locking one of said loose gears to said countershaft, means including a splined element adapted for interfitting with said spider spline and constantly interfitted with one of the shafts of said axle structure connecting mechanism, said last mentioned shaft extending into said spider and means interiorly of the spider for further guiding the inserted shaft end.

3. In a transmission, the combination of a gear set including a differential spider having an internally splined central annulus, a pair of axle structures, separate means connected with said gear set for transmitting rotational movement to said axle structures respectively, separate trains of mechanism connected with said spider and adapted for different speed ratios, a shifting device adapted to complement either of said mechanisms and a second shifting device comprising an internally and externally splined sleeve coaxial with said spider and adapted, within the confines of the latter, for simultaneous splined driving connection both with an enveloped shaft of one of said axle rotating means and with the central annulus of said spider.

4. In combination, a drive shaft, a pair of differential axle structures, a differential gear set including a spider, driving mechanism including a shaft connecting each axle structure with said differential gear set, alternative driving trains each including only two units between said drive shaft and said differential gear set, said trains being adapted to rotate said spider at relatively different rates of speed, means for selectively effecting the operative engagement of one of the units of each train to complete the rotatable connection therethrough and means axially movable into said spider for locking the latter to one of said axle-structure driving mechanisms to cause the latter and said spider to rotate in unison and a pilot bearing between said spider and one end of one of said axle-structure-connected shafts whereby to reinforce against shearing strains.

5. In a tandem rear axle drive, the combination of a power shaft, a differential gear set connected therewith and including a centrally-hollowed spider, a pair of axles, a connection between each axle and said gear set, one of said connections including a shaft projecting coaxially into said spider, a pilot bearing for steadying said last mentioned shaft within the spider and an interlocking sleeve adapted to be shifted to a position between said spider-intersecting shaft and spider within the confines of the latter whereby to cause said shaft and spider to rotate in unison.

6. A multiple axle drive comprising the combination of a driving shaft, a pair of driven shafts, all of said shafts being axially alined and separated, a countershaft disposed alongside of said shafts, a rotatable connection between one end of said countershaft and said driving shaft, another rotatable connection including a differential gear set between the countershaft and said driven shafts, a clutch control for one of said connections and crosswise extending axle structures at remote ends of said driven shafts and operatively connected therewith.

7. In a tandem rear axle drive, the combination of a power shaft, a differential gear set connected therewith and including a splined spider, a pair of axle structures, connections between each axle structure and said gear set, one of said connections including a splined element adapted to coact with said spider, means for shifting said element into engagement with said spider whereby to lock said set against exercise of its differential function and means for steadying said locking engagement.

ORPHEUS F. QUARTULLO.